United States Patent [19]

Hehl

[11] Patent Number: 4,487,386
[45] Date of Patent: Dec. 11, 1984

[54] STRAIN RELIEF ASSEMBLY FOR ANGULAR CABLE ATTACHMENT

[76] Inventor: Karl Hehl, Arthur-Hehl-Strasse 32, 7298 Lossburg 1, Fed. Rep. of Germany

[21] Appl. No.: 354,603

[22] Filed: Mar. 4, 1982

[30] Foreign Application Priority Data

Mar. 4, 1981 [DE] Fed. Rep. of Germany ....... 3108085

[51] Int. Cl.³ .................................................. F16L 5/00
[52] U.S. Cl. ..................... 248/56; 174/153 G
[58] Field of Search ............................. 248/56, 27.1; 174/153 G, 65 G; 339/103 B; 403/197, 194, 195, 215

[56] References Cited

U.S. PATENT DOCUMENTS

| | | | |
|---|---|---|---|
| 2,538,614 | 1/1951 | Austin | 403/195 |
| 2,573,600 | 10/1951 | Pruehs | 339/103 B |
| 3,744,008 | 7/1973 | Castellani | 248/56 |
| 3,958,300 | 5/1976 | Tanaka | 403/197 |
| 4,034,944 | 7/1977 | Moran | 248/56 |
| 4,234,218 | 11/1980 | Rogers | 248/56 |
| 4,265,420 | 5/1981 | McCormick | 248/56 |

Primary Examiner—William H. Schultz
Assistant Examiner—Ramon O. Ramirez
Attorney, Agent, or Firm—Joseph A. Geiger

[57] ABSTRACT

A strain relief assembly for the angular throughfeed and attachment of a 90°-deflected cable to the wall of a receptacle or enclosure comprising a threaded clamping sleeve with an enlarged clamping collar cooperating with a pot-shaped clamping cover which is adjustably clampable to the collar side of the clamping sleeve, while abutting against the latter opposite a cable pinching recess in the cover side wall. This abutments form a fulcrum about which the clamping cover is tiltable to clamp cables of different diameters. For mounting in a threaded bore, the threaded portion of the clamping sleeve has transverse slots defining yielding sectors which, when deflected in the axial direction by clamping screws, create a clamping interference between the threads of the clamping sleeve and of the bore.

10 Claims, 9 Drawing Figures

STRAIN RELIEF ASSEMBLY FOR ANGULAR CABLE ATTACHMENT

BACKGROUND OF THE INVENTION

1. Field of the Invention

The present invention relates to strain relief attachments for flexible cables and, more particularly, to a strain relief assembly for the angular throughfeed and attachment of a 90°-deflected cable to the wall of a receptacle or enclosure in such a way that the deflected portion of the cable is selectively orientable in one at least two different directions.

2. Description of the Prior Art

A known strain relief assembly for the angular attachment of an electrical supply cable to the sheet metal wall of a production machine or of a control panel is disclosed in the German Gebrauchsmuster (Utility Model) No. 76 22 224. It features a clamping cover in the form of an angular housing which is attached to the outer side of the sheet metal wall and cooperates with a clamping ring on the inner side of that wall. The alignment between the clamping ring and the housing is obtained by means of centering pins of centering pins which extend from the housing through apertures in the wall and in the clamping ring, engaging the edges of both apertures. Screws reaching from the housing into the clamping ring press the assembly against the sheet metal wall.

The cable clamping element of this strain relief assembly is a clamping bracket with two screws engaging threaded bores of the housing. The screws, when tightened, clamp and deform a flexible protective tube of plastic material and its inner metallic reinforcing sleeve between the bracket and the housing. This angular strain relief attachment, while making it possible to selectively orient the electrical supply cable in one of two different radial directions, necessitates a comparatively large space.

SUMMARY OF THE INVENTION

Underlying the present invention is the objective of improving upon the above-mentioned known angular strain relief assembly in such a way that plastic-sheathed cables of different diameters arriving from selectively different directions are attachable to a flat sheet metal wall or to the thickwalled housing of an apparatus, e.g. a block-type switch housing, and that the attachment requires a minimum of space. Furthermore, the angular strain relief assembly it to require a minimum number of component parts, and the latter are to lend themselves to lost-cost mass production as injection-molded plastic parts, so that the no machining operations are required.

The present invention proposes to attain this objective by suggesting that one of the clamping members be a threaded clamping sleeve which surrounds the plastic-sheathed cable and its supply conductors and is adapted to be clamped to the wall of a switch housing or to the sheet metal wall of a control cabinet, for example, and the other clamping member is a pot-shaped clamping cover accommodating the cable in an axial recess which is orientable in different radial directions with respect to the attached clamping sleeve.

Such a configuration meets the requirement of a reliable clamping action on cables of different diameters. In a preferred embodiment of the invention, the capability of clamping cables of different diameters between the clamping sleeve and the clamping cover is the result of a limited pivotability of the clamping cover about a fulcrum line which is perpendicular to the direction of the arriving cable and located diametrically opposite the axial recess inside which the cable is clamped.

The proposed angular strain relief assembly also offers the possibility to adjustably clamp the clamping sleeve of the assembly in a threaded bore of a thick-walled housing in different angular orientations by means of a thread-clamping interference configuration between the female threads of the threaded bore and axially yielding threaded portions of the clamping sleeve. A simple clamping nut in engagement with the threads of the clamping sleeve serves for the attachment of the clamping sleeve to a thin sheet meal wall.

BRIEF DESCRIPTION OF THE DRAWINGS

Further special features and advantages of the invention will become apparent from the description following below, when taken together with the accompanying drawings which illustrate, by way of example, a preferred embodiment of the invention represented in the various figures as follows.

DESCRIPTION OF THE PREFERRED EMBODIMENT

Figure 1:
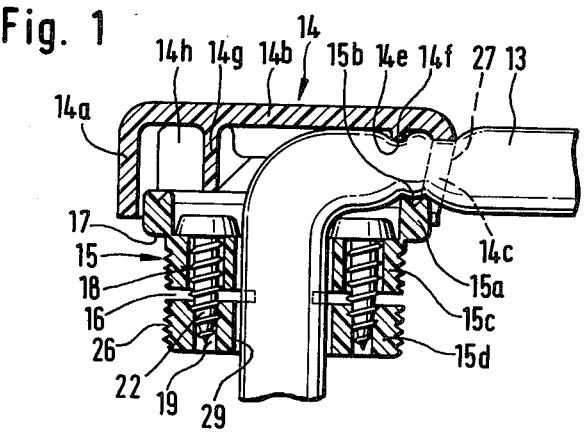
FIG. 1 shows, in an elevational cross section taken along line I—I of FIG. 3, an embodiment of the invention in the form of an angular strain relief assembly for the through-feed and attachment of a cable to a block-shaped switch housing (outlined in FIG. 4)
Figure 2:
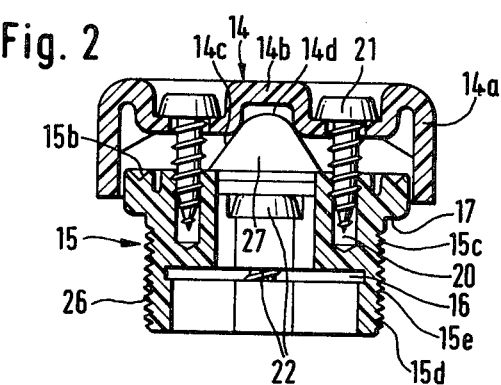
FIG. 2 shows the strain relief assembly of FIG. 1 in an elevational cross section taken along line II—II of FIG. 3, the clamped cable being not shown.

The angular strain relief assembly of the invention, as illustrated in FIGS. 1 and 2, for example, consists essentially of a pot-shaped clamping cover 14 and a threaded clamping sleeve 15 to which the clamping cover 14 is adjustably clampable by means of two attachment screws 21. The clamping cover 14 has a substantially flat uppper end wall 14b with two recessed bores 25 for the attachment screws 21, the end wall 14b being adjoined by a downwardly extending cylindrical side wall 14a.

The threaded clamping sleeve 15 has an enlarged clamping collar 15a on its upper axial extremity adjoined by a smaller lower body portion which is externally threaded and transversely weakened by two oppositely located radial slots 16 which define an upper threaded portion 15c, a lower threaded end portion 15d, and a connection region 15e between the two threaded portions.

Figure 3:
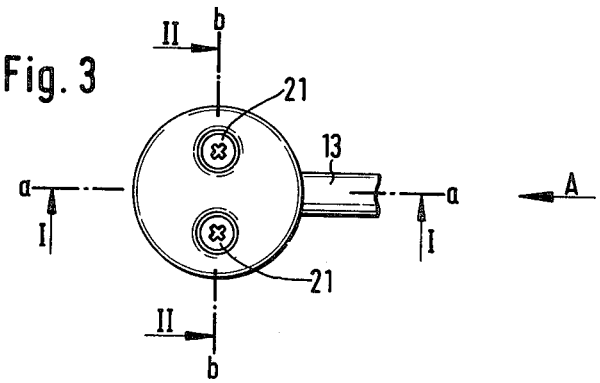
FIG. 3 shows the angular strain relief assembly of FIGS. 1 and 2 in a plan view, at a reduced scale.

The clamping collar 15a of the threaded clamping sleeve 15 has on its upper axial side a V-groove 15b, the side wall 14a of the clamping cover 14 reaching downwardly a short distance over the outer diameter of the clamping collar 15a. As can be seen in FIGS. 1 and 3, the cable 13 with its multiple electrical supply conductors (not shown) enters the strain relief assembly in a radial direction, via an axial recess 27 in the side wall 14a of the clamping cover 14. The orientation of the entering cable 13 is defined as the radial plane a—a (FIG. 3). Underneath the clamping cover 14, the cable 13 is bent from its radial orientation into a vertical orientation in which it extends through the axial entry bore 29 of the threaded clamping sleeve 15 (FIG. 1).

The axial recess 27 in the side wall 14a is formed by two oppositely inclined pinch edges 14c. The angle of inclination of the two pinch edges 14c to the vertical axis c—c of the threaded clamping sleeve 15 (FIG. 5) is approximately 45°, and the two inclined pinch edges 14c are joined by a bottom radius which forms a pinch edge fillet 14d. The pinch edge fillet 14d is located at a small distance from the inner surface of the end wall 14b of the clamping cover 14.

On the inside of the side wall 14a, at a spacing from the latter which is slightly greater than the radial width of the clamping collar 15a, is further arranged a transverse rib 14f which extends downwardly from the end wall 14b. This rib 14f has a recess in approximate radial alignment with the bottom portion of the axial recess 27, forming a second pinch edge 14e at about the same level as the pinch edge fillet 14d of the axial recess 27. The latter, however, is approximately three or four times as deep as the recess formed by the pinch edge 14e in the rib 14f.

FIG. 1 shows how the inclined pinch edges 14c and its pinch edge fillet 14d, together with the pinch edge 14e, cooperate with the clamping collar 15a and its V-groove 15b to pinch and deform the cable 13, so as to provide a protective strain relief for the cable portion located inside the strain relief assembly, when a tensile force is applied to the radial cable portion outside the assembly.

The pinching force between the threaded clamping sleeve 15 and the clamping cover 14 is obtained by means of the two attachment screws 21 which pull the clamping cover 14 downwardly against the threaded clamping sleeve 15, as they are threaded into the latter. The line of engagement b—b of the two attachment screws 21 (FIG. 3) is located in a plane of the strain relief assembly which is perpendicular to the radial plane a—a of the cable 13.

Opposing the clamping force of the two attachment screws 21, on the side opposite to the pinched cable 13 with respect the line of screw engagement b—b, are two abutment ribs 14h of the clamping cover 14 with which the latter abuts against the axial extremity of the threaded clamping sleeve 15, as can be seen in FIG. 1. This abutment serves as a pivot fulcrum for the clamping cover 14, thereby making it possible to effectively clamp cables of different diameter between the clamping cover 14 and the clamping collar 15a of the clamping sleeve 15.

The dimensions of the clamping cover 14 are preferably chosen in such a way that the end wall 14b of the clamping cover 14 is oriented approximately parallel to the clamping collar 15a, when clamping a cable 13 of maximum diameter, and that it is inclined downwardly towards the threaded clamping sleeve 15, when clamping a cable 13 of smaller diameter in the strain relief assembly.

Figure 6:
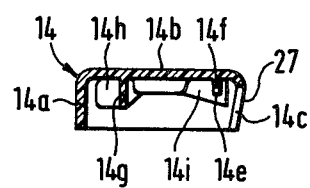
FIG. 6 shows the clamping cover of the strain relief assembly of FIG. 1.
Figure 8:
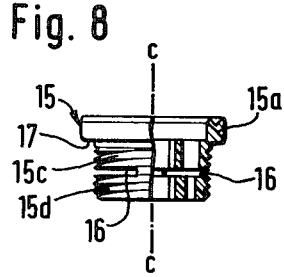
FIG. 8 shows the threaded clamping sleeve of the assembly of FIG. 1, partially cross-sectioned.
Figure 7:
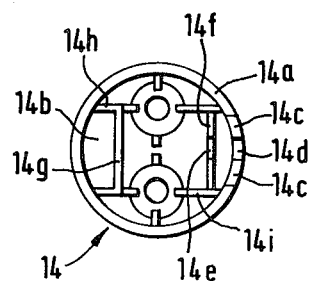
FIG. 7 shows the clamping cover of FIG. 6, as seen from below.

As can be seen in FIGS. 6 and 7, the two abutment ribs 14h of the clamping cover 14 also serve as reinforcing members between the eye portions surrounding the recessed bores 25. Two similar reinforcing ribs 14i are arranged on the opposite side of the eye portions in alignment with the abutment ribs 14h. The rib 14f extends transversely between the reinforcing ribs 14i, and a similar transverse connecting rib 14g extends between the abutment ribs 14h to give the clamping cover 14 added stability.

Figure 9:
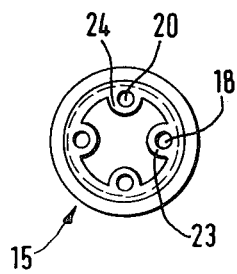
FIG. 9 shows the threaded clamping sleeve of FIG. 8 in a plan view.

As can be seen in FIG. 2, the two attachment screws 21 engage blind tap bores 20 in the threaded clamping sleeve 15. FIG. 9 shows that the tap bores 20 are surrounded by eye portions 24. Since both the clamping cover 14 and the threaded clamping sleeve 15 are injection-molded plastic parts, the female threads in the tap bores 20 are conveniently formed by the attachment screws 21 themselves during assembly. For this purpose, the screws 21 are self-tapping screws of the spaced-thread type.

The two radial slots 16 in the threaded portion of the clamping sleeve 15 are so arranged that the connection region 15e of the latter coincides angularly with the eye portions 24 of the tap bores 20, thereby defining a threaded end portion 15d with two axially yielding sectors on opposite sides of the two eye portions 24.

Two vertical clamping screws 22 reach through bores 18 of the threaded portion 15c into tap bores 19 of the threaded end portion 15d, as can be seen in FIG. 1. Accordingly, when the clamping screws 22 are tightened, the yielding sectors of the threaded end portion 15d are deflected axially towards the threaded portion 15c to produce a thread-clamping interference with a cooperating female thread in the mounting bore of a receptacle or enclosure, such as the supply bore 11 of the switch housing 10 of FIG. 4, for example. The two clamping screws 22 are arranged in alignment with the radial plane a—a. Their throughbores 18 and tap bores 19 are surrounded by eye portions 23 (FIG. 9). The clamping screws are selftapping screws which form the female threads in the tap bores 19 during assembly.

Figure 4:
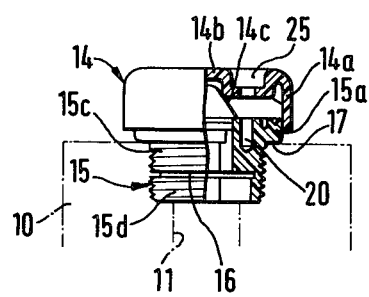
FIG. 4 shows the strain relief assembly in the same orientation as in FIG. 2, partially cross-sectioned and mounted on a block-shaped switch housing, for example.

This thread clamping means makes it possible to secure the strain relief assembly in any desired angular orientation in relation to the supply bore 11 of the switch housing 10, for example. It should therefore be understood that the annular shoulder 17 of the threaded clamping sleeve 15 need not be in abutment with the outer face of the switch housing 10, as is shown in FIG. 4.

Figure 5:
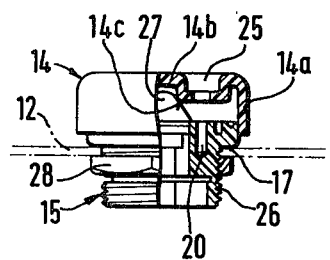
FIG. 5 is similar to FIG. 4, showing the strain relief assembly mounted on a sheet metal wall of a control cabinet, for example.

FIG. 5 shows that the strain relief assembly of the invention is also attachable to a sheet metal wall 12 which may be a the wall of a control cabinet, for example. In this case, however, the clamping screws 22 are not being used in the assembly, since no female thread is present to cooperate with the threaded portions 15c and 15d of the clamping sleeve 15. Instead, the clamping action is obtained by means of a clamping nut 28 which cooperates with the threaded portions 15c and 15d of the clamping sleeve 15 to press its annular shoulder 17 against the outer face of the sheet metal wall 12. Again, the strain relief assembly can be clamped in any desired angular orientation.

It should be understood, of course, that the foregoing disclosure describes only a preferred embodiment of the invention and that it is intended to cover all changes and modifications of this example of the invention which fall within the scope of the appended claims.

I claim:

1. A strain relief assembly for the angular through-feed and attachment of a cable to the wall of a receptacle or enclosure, the assembly comprising in combination;
   a threaded clamping sleeve having an outwardly cylindrical main body with an externally threaded length portion and an enlarged clamping collar adjoining the main body on the outer axial extremity thereof, so as to form an axially inwardly facing annular shoulder, the main body being insertable into an aperture in the wall of said receptacle or enclosure and positionable against the outer surface of the latter by means of its annular shoulder, the clamping sleeve further having an axial passage for the accommodation therein of an axially oriented length portion of the cable;
   means for securing the threaded clamping sleeve in the aperture of said receptacle or enclosure; and
   a cap-shaped clamping cover adjustably clampable to the axially outer side of the threaded clamping sleeve by means of a plurality of threaded fasteners reaching axially through the clamping cover into the threaded clamping sleeve, the clamping cover having an end wall adjoined by a substantially cylindrical axially inwardly extending side wall of a diameter which is slightly larger than the diameter of the clamping collar of the clamping sleeve, so as to axially overlap the latter in a clamped configuration, the clamping cover having in its side wall an axial recess which, in the clamped configuration, forms a passage for a radially oriented length portion of the cable, pinching the latter between it and the clamping collar of the threaded clamping sleeve.

2. A strain relief assembly as defined in claim 1 wherein
   the axial length of the main body of the threaded clamping sleeve is greater than the thickness of the wall of the receptacle or enclosure to which it is to be attached; and
   the clamping sleeve securing means includes a nut which is engageable over the thread of the clamping sleeve main body on the inner side of said wall, thereby pulling the clamping sleeve axially inwardly and pressing its annular shoulder against the outer side of said wall.

3. A strain relief assembly as defined in claim 1, wherein
   the aperture in said receptacle or enclosure wall is a bore with an internally threaded length portion engageable by the threaded length portion of the clamping sleeve; and
   the clamping sleeve securing means includes means for creating a clamping interference between the cooperating threads of the aperture and the clamping sleeve.

4. A strain relief assembly as defined in claim 3, wherein
   said means for creating a clamping interference includes at least one radial slot in the threaded length portion of the clamping sleeve main body, as a result of which an end portion of the threaded length portion is capable of executing a small axial deflective displacement relative to the remaining threaded length portion, the interference creating means further including at least one threaded clamping member engaging the clamping sleeve main body on axially opposite sides of the radial slot to create said deflective displacement.

5. A strain relief assembly as defined in claim 4, wherein
   the threaded clamping sleeve is an injection-molded plastic part; and
   the clamping sleeve main body has two diametrically opposite radial slots in its threaded length portion, as a result of which the connecting region between the threaded end portion and the remaining threaded length portion is reduced to two narrow connecting bridges about which opposite sectors of the threaded end portion can execute small axial deflective displacements, each of said sectors being engaged by a threaded clamping member in the form of a thread forming head screw of the spaced-thread type reaching axially inwardly through a throughbore in the remaining threaded length portion into a tap bore in the center of the displaceable sector.

6. A strain relief assembly as defined in any one of claims 1 through 3, wherein
   the clamping collar of the threaded clamping sleeve has a substantially planar outer end face and, in said end face, an axially open annular V-groove reducing the end face to two concentric ridge formations designed to pinch said radially oriented length portion of the cable in the clamped configuration.

7. A strain relief assembly as defined in any one of claims 1 through 3, wherein
   the axial recess in the clamping cover side wall is V-shaped in outline, defining two inclined pinch edges which are joined by a central pinch edge fillet reaching to within a short distance of the inner surface of the clamping cover end wall, so that a surface portion of said end wall adjacent to the pinch edge fillet bears against the cable in the clamped configuration.

8. A strain relief assembly as defined in claim 7, wherein
   the clamping cover further includes, on the inner surface of its end wall, an axially extending rib located at a distance from, and approximately parallel to, the pinch edges of the clamping cover recess, said rib forming an inner central pinch edge in general radial alignment with the pinch edge fillet of the clamping cover recess;
   the threaded clamping sleeve has on its clamping collar an axially outwardly facing annular end face; and
   the radial locations of said central pinch edge and said pinch edge fillet are such that they are located on radially opposite sides of said clamping collar end face and substantially equidistant therefrom.

9. A strain relief assembly as defined in any one of claims 1 through 3, wherein
   the clamping collar of the threaded clamping sleeve and the clamping cover define axial abutment means in an area which is diametrically opposite the axial recess of the clamping cover, said abutment means limiting the axial distance of approach and of axial overlap between said collar and the clamping cover side wall in a clamped configuration; and the threaded fasteners which serve to adjustably clamp the cover to the threaded clamping sleeve are two in number and arranged between said abutment means and clamping cover recess, so that, with the abutment means serving as a clamping fulcrum, the region of the clamping cover containing the cable-pinching side wall recess assumes a position of varying proximity to the clamping collar of the threaded clamping sleeve, depending on the thickness of the cable being pinched in a clamping configuration.

10. A strain relief assembly as defined in claim 9, wherein said axial abutment means includes two abutment ribs extending axially inwardly from the end wall of the clamping cover to a plane, where they are axially recessed a short distance from the inner edge of the clamping cover side wall, so as to limit said axial overlap to said short distance, the two ribs being oriented parallel to the radially oriented length portion of the cable and arranged on opposite sides of the latter, at a distance corresponding to the lateral spacing between the two threaded fasteners.

* * * * *